US011901662B2

(12) United States Patent
Xu et al.

(10) Patent No.: US 11,901,662 B2
(45) Date of Patent: Feb. 13, 2024

(54) CONNECTOR HOUSING, A CONNECTOR AND A CONNECTOR ASSEMBLY

(71) Applicant: Tyco Electronics (Shanghai) Co. Ltd., Shanghai (CN)

(72) Inventors: Qin (Candy) Xu, Shanghai (CN); Hongbo (Daniel) Zhang, Shanghai (CN); Jianding Du, Shanghai (CN)

(73) Assignee: Tyco Electronics (Shanghai) Co., Ltd., Shanghai (CN)

(*) Notice: Subject to any disclaimer, the term of this patent is extended or adjusted under 35 U.S.C. 154(b) by 144 days.

(21) Appl. No.: 17/538,059

(22) Filed: Nov. 30, 2021

(65) Prior Publication Data

US 2022/0173540 A1 Jun. 2, 2022

(30) Foreign Application Priority Data

Nov. 30, 2020 (CN) ........................ 202011374612.9

(51) Int. Cl.

| | |
|---|---|
| ***H01R 13/05*** | (2006.01) |
| ***H01R 13/24*** | (2006.01) |
| ***H01R 12/71*** | (2011.01) |
| ***H01R 13/41*** | (2006.01) |
| ***H01R 12/58*** | (2011.01) |

(52) U.S. Cl.

CPC ......... *H01R 13/057* (2013.01); *H01R 12/716* (2013.01); *H01R 13/2471* (2013.01); *H01R 12/58* (2013.01); *H01R 13/41* (2013.01)

(58) Field of Classification Search

CPC ................ H01R 13/057; H01R 12/716; H01R 13/2471; H01R 12/58; H01R 13/41; H01R 12/7023; H01R 13/4367; H01R 12/727; H01R 13/40; H01R 13/04; H01R 13/46

See application file for complete search history.

(56) References Cited

U.S. PATENT DOCUMENTS

| | | | | |
|---|---|---|---|---|
| 5,080,596 A * | 1/1992 | Viselli | H01R 12/724 | 439/79 |
| 5,453,016 A * | 9/1995 | Clark | H01R 12/724 | 439/79 |
| 5,725,386 A * | 3/1998 | Davis | H01R 12/725 | 439/79 |
| 6,109,935 A * | 8/2000 | Yang | H01R 12/725 | 439/80 |
| 9,899,780 B2 * | 2/2018 | Pocrass | H01R 24/64 | |

* cited by examiner

*Primary Examiner* — Briggitte R. Hammond
(74) *Attorney, Agent, or Firm* — Barley Snyder

(57) ABSTRACT

A connector housing includes a body defining an accommodating channel sized to receive a pin terminal, and a blocking structure formed in the accommodating channel and positioned to prevent a bent portion of a pin terminal from rebounding.

20 Claims, 3 Drawing Sheets

CONNECTOR HOUSING, A CONNECTOR AND A CONNECTOR ASSEMBLY

CROSS-REFERENCE TO RELATED APPLICATIONS

This application claims the benefit of Chinese Patent Application No. 202011374612.9 filed on Nov. 30, 2020, the whole disclosure of which is incorporated herein by reference in its entirety.

FIELD OF THE INVENTION

The present invention relates to electrical connectors, and more specifically, to a connector housing, a connector and a connector assembly.

BACKGROUND

Pin terminals used in electrical connectors often feature bends formed therein prior to insertion into a connector body. When a bending jig is removed, however, the bent portion will easily rebound, resulting in the position of the bent portion in the vertical direction being out of tolerance. Therefore, there is an urgent need for a connector housing that can keep the position of the bent portion of the pin terminal stable.

SUMMARY

A connector housing according to an embodiment of the present disclosure includes a body defining an accommodating channel sized to receive a pin terminal, and a blocking structure formed in the accommodating channel and positioned to prevent a bent portion of a pin terminal from rebounding.

BRIEF DESCRIPTION OF THE DRAWINGS

The invention will now be described by way of example with reference to the accompanying Figures, of which.

DETAILED DESCRIPTION OF THE EMBODIMENTS

Figure 1:
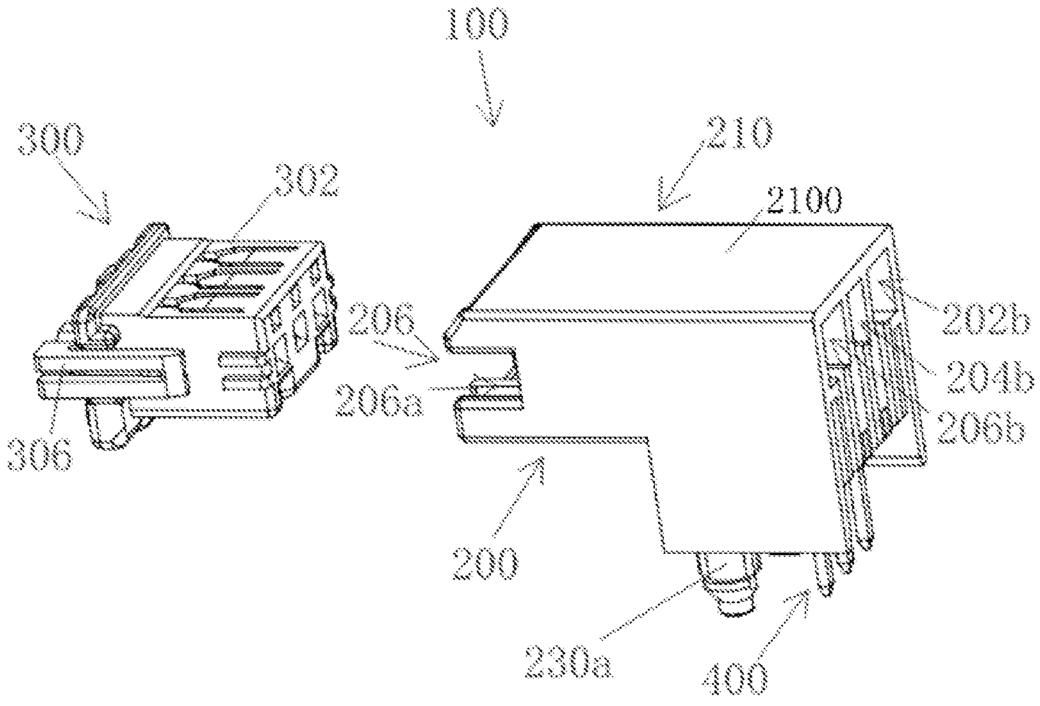
FIG. 1 is an exploded schematic diagram of a connector assembly according to an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present invention provides a connector assembly, comprising: at least one pin terminal, each of the at least one pin terminal including a straight portion and a bent portion; a first connector housing including a first body formed with at least one accommodating channel; wherein each of the at least one accommodating channel configured to accommodate the at least one pin terminal, and each of the at least one accommodating channel provided with at least one blocking structure, and each of the at least one blocking structure used to prevent a bent portion of a corresponding pin terminal from rebounding.

Figure 2:
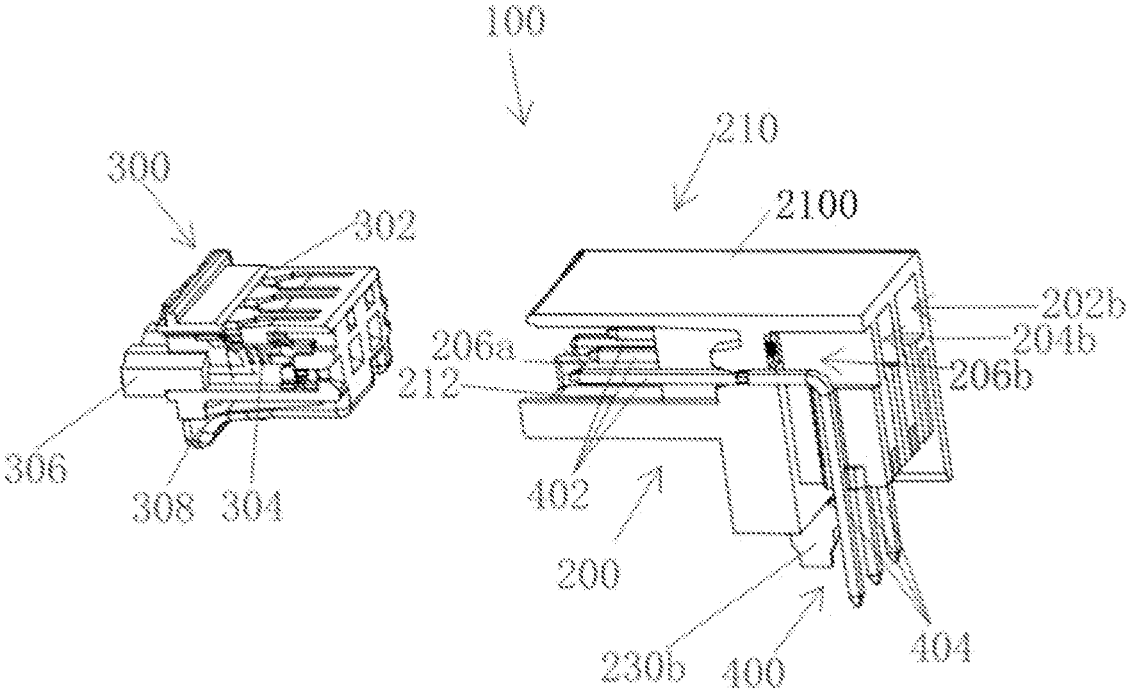
FIG. 2 is a partial cutaway view of the connector assembly of FIG. 1.
Figure 3:
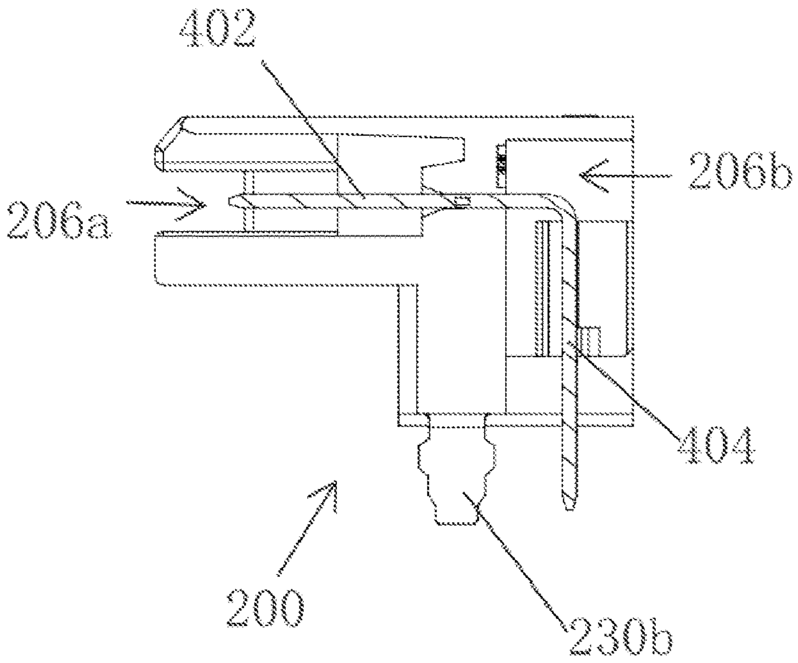
FIG. 3 is a front view of the connector in FIG. 2.

The front, back, left, right, top, bottom, front end, rear end, left end, right end, upper, bottom, left side, right side, longitudinal, horizontal, etc. in the present invention are all used with reference to FIGS. 1 and 2. In addition, the connectors in FIGS. 1 and 2 are rotated in FIGS. 5 and 6 in order to show the corresponding structures and components more clearly.

Referring generally to FIGS. 1-6, according to an embodiment of the present disclosure, the connector assembly 100 includes a connector 200 and a mating connector 300. The connector 200 includes a connector housing 210 and three pin terminals 400, each pin terminal 400 includes a straight portion 402 and a bent portion 404. The connector housing 210 includes a body 2100. The body 2100 is formed with three accommodating channels 202, 204, and 206. Each of the accommodating channels 202, 204, and 206 is configured to accommodate a pin terminal 400. Specifically, the accommodating channel 202 includes an accommodating cavity **202*a* and an open groove 202*b* communicating with the accommodating cavity 202*a*, and the accommodating channel 204 includes an accommodating cavity 204*a* and an open groove 204*b* communicating with the accommodating cavity 204*a*, the accommodating channel 206*a* includes an open groove 206*b* communicating with the accommodating cavity 206*a***.

Figure 4:
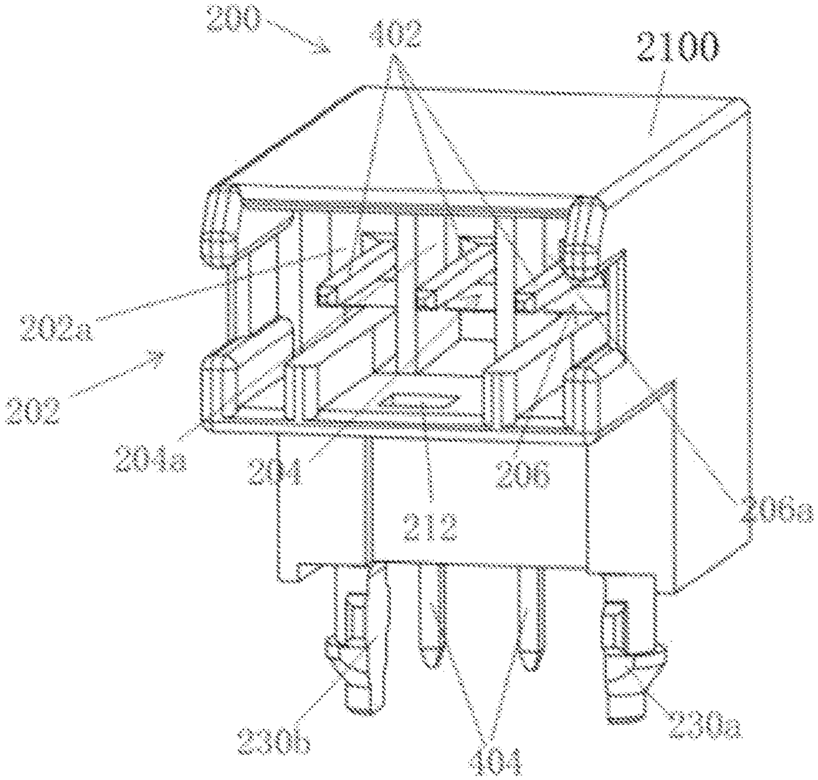
FIG. 4 is a left perspective view of the connector in FIG. 1.
Figure 5:
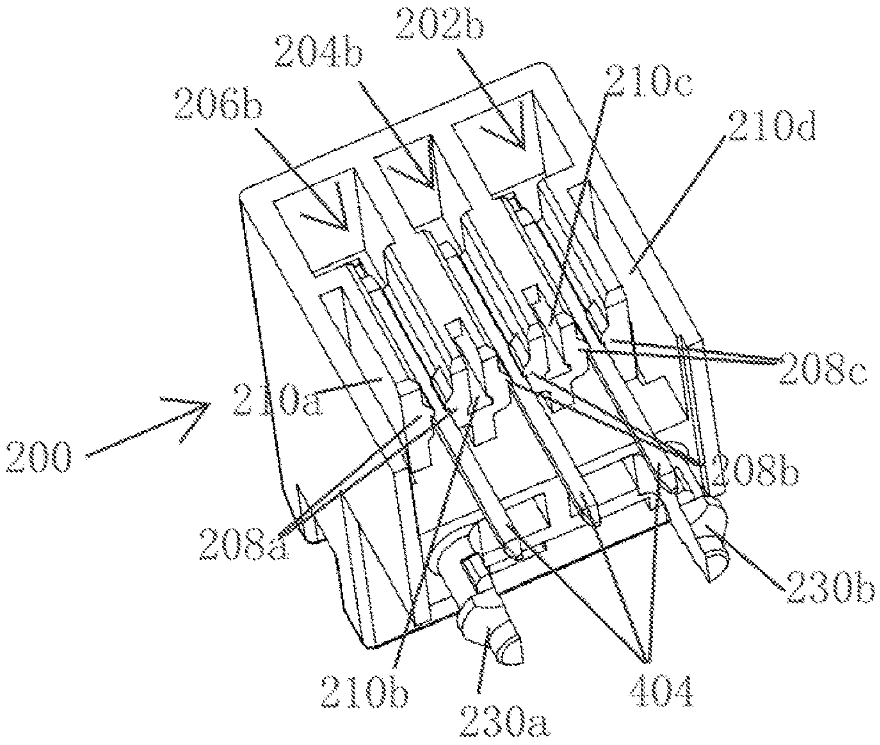
FIG. 5 is a perspective schematic diagram of the connector of FIG. 1 after being rotated by an angle.
Figure 6:
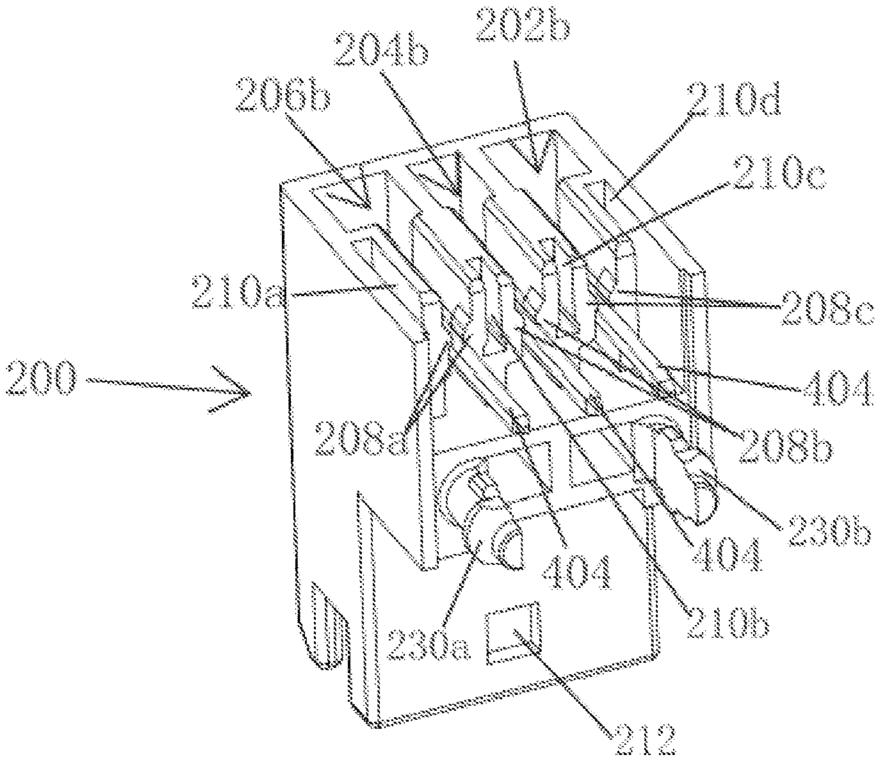
FIG. 6 is a perspective schematic view of the connector of FIG. 1 after being rotated by another angle.

The accommodating cavities **202*a*, 204*a*, and 206*a* respectively accommodate a straight portion 402 of a corresponding pin terminal, and the open grooves 202*b*, 204*b*, and 206*b* respectively accommodate a bending portion 404 of a corresponding pin terminal, the side walls of the open grooves 202*b*, 204*b*, 206*b* are respectively provided with blocking structures 208*a*, 208*b*, 208*c*. As shown in FIGS. 4 and 5, each of blocking structures 208*a*, 208*b*, and 208*c* comprises a pair of protrusions extending from the two side walls of the corresponding open groove. Each of the blocking structures 208*a*, 208*b*, and 208*c* is configured to block the bent portion 404 of a corresponding pin terminal 400 from rebounding. As shown in FIGS. 2 and 6, the accommodating cavity of the body 2100 is provided with a locking hole 212 penetrating through the lower surface of the body 2100**.

As shown in FIGS. 5 and 6, the side walls of the open grooves **202*b*, 204*b*, and 206*b* are respectively provided with buffer openings 210*a*, 210*b*, 210*c*, and 210*d*, such that the corresponding bent portion 404** is pressed or lifted through the corresponding blocking structure. At least a part of the corresponding blocking structure can be elastically moved toward the corresponding buffer openings on both sides of the blocking structure, such that the blocking structure bears a small force, the blocking structure is not easily damaged, and the buffer opening on the side wall can save manufacturing materials.

Referring to FIGS. 1 and 2, the connector assembly 100 further includes a mating connector 300 mated with the connector 200. The mating connector 300 includes a connector housing 302, a connecting terminal 304, and a terminal position assurance (TPA) 306, wherein, the connector housing 302 has a locking portion 308 (as shown in FIG. 2), which is used to cooperate with the locking hole 212 of the body 2100 to fix the connector housing 302 on the connector housing 210. The connector housing 302 is formed with three cavities corresponding to the accommodating channels 202, 204 and 206, and each cavity accommodates a connecting terminal 304. One end (the right end as shown in FIG. 2) of the connecting terminal 304 is connected to the straight portion 402 of the corresponding pin terminal 400 and the other end (the left end as shown in FIG. 2) is connected to an external wire (not shown).

In the embodiment shown in FIGS. 1 and 2, the terminal position assurance 306 is a separate component independent of the connector housing 302. In another embodiment, the terminal position assurance 306 can be detachably provided on the connector housing 302. Specifically, when assembling the connector assembly 100, the following steps are performed: (1) Three pin terminals 400 are inserted into the accommodating channels 202, 204, and 206, respectively, such that the straight portions 402 of the pin terminals 400 are respectively accommodated in 202*a*, 204*a*, and 206, and the bent portion 404 of the pin terminal 400 are respectively accommodated in 202*b*, 204*b*, 206*b*; (2) A pair of supporting posts 230*a*, 230*b* of the connector 200 and the bent portions 404 of the pin terminals 400 are inserted into the PCB board below (not shown in the figure) and the bent portions 404 are soldered on the PCB board; (3) The connector housing 302 of the mating connector 300 is inserted into the connector housing 210 of the connector 200 from the positions shown in FIG. 1 and FIG. 2 to the right, such that the connector housing 302 is locked on the connector housing 210 through the cooperation of the locking portion 308 and the locking hole 212, and the straight portions 402 of the three pin terminals 400 are inserted into the corresponding cavity of the housing 302 and connected to the right end of the connecting terminal 304 in the corresponding cavity respectively; (4) three external wires (not shown) are connected to the left end of the connecting terminal 304 respectively; (5) the terminal position assurance (TPA) 306 is inserted into the cavity of the connector housing 302 of the connector 300 to ensure that the connection terminal 304 is installed in place. It should be understood that the executing order of the above steps (1) to (5) can be adjusted accordingly as needed without strictly following the above order.

It should be understood that although in the embodiment shown in FIGS. 1-6, the connector 200 can accommodate three pin terminals, in another embodiment, the connector 200 can only accommodate one pin terminal or two pin terminals as required, or the terminal connector 200 can accommodate any number of pin terminals. At this time, the connector housing 210 has a number of accommodating cavities, open grooves, and blocking structures corresponding to the number of pin terminals, and correspondingly, the mating connector 300 may also accommodate only one connecting terminal or two connecting terminals or any number of connecting terminals can be accommodated, and the connector housing 302 has a number of cavities corresponding to the number of connecting terminals.

It should also be understood that although in the embodiments shown in FIGS. 1-6, each accommodating channel in the connector housing 210 includes only one accommodating cavity, in other embodiments, each accommodating channel of the connector housings 210 may include two or more accommodating cavities, but in any embodiment, the number of accommodating cavities and the number of open grooves are in a one-to-one correspondence.

With the connecting device provided by the present invention, a blocking structure is provided in the up-down direction of a bent portion of a pin terminal, the bent portion can be fixed at the set position, and the bent portion is prevented from rebounding due to a long time, thereby effectively improving the stability of the position of the pin terminal, providing a good user experience, while reducing manufacturing process defects and saving manufacturing costs.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector housing, comprising:
- a body defining a channel sized to receive a pin terminal, the channel including:
  - a cavity sized to accept a straight portion of a pin terminal; and
  - an open groove corresponding to and communicating with the cavity, the groove sized to accept a bent portion of the pin terminal; and
- a blocking structure formed in the channel on side walls of the open groove, and positioned to prevent the bent portion of the pin terminal from rebounding, at least one side wall of the open groove includes a buffer opening such that the bent portion of the pin terminal is pressed or lifted through the blocking structure.

2. The connector housing according to claim 1, wherein at least a portion of the blocking structure can be elastically moved toward the buffer opening.

3. The connector housing according to claim 1, wherein the blocking structure includes a pair of protrusions extending toward each other from two side walls of the open groove.

4. The connector housing according to claim 1, wherein a free end of the bent portion extends outwardly from the body of the pin terminal, such that the bent portion of the pin terminal can form an electrical connection with an external PCB board.

5. The connector housing according to claim 4, further comprising a pair of supporting posts extending from a lower surface of the body for fixing the connector housing on the PCB board.

6. A connector comprising:
- a first connector housing including a first body formed with a channel;
- a pin terminal including a straight portion and a bent portion arranged in the channel;
- a blocking structure positioned relative to the channel to prevent the bent portion of a pin terminal from rebounding,
- a mating connector mated with the first connector housing, including:
  - a connecting terminal;
  - a second connector housing including a second body formed with a cavity corresponding to the channel and receiving the connecting terminal; and
  - a terminal position assurance device, at least portion of the terminal position assurance arranged within the cavity and abutting the connecting terminal.

7. The connector according to claim 6, wherein the channel includes:
- a cavity sized to accept a straight portion of a pin terminal; and
- an open groove corresponding to and communicating with the cavity, the groove sized to accept the bent portion of a pin terminal.

8. The connector according to claim 7, wherein the blocking structure is arranged on side walls of the open groove and is elastically movable.

9. The connector according to claim 8, wherein at least one side wall of the open groove is provided with a buffer opening such that the corresponding bent portion is pressed or lifted through a corresponding blocking structure.

10. The connector according to claim 7, wherein the blocking structure includes a pair of protrusions extending toward each other from two side walls of the open groove.

11. The connector according to claim 6, wherein the first connector housing further comprises a pair of supporting posts extending from a lower surface and parallel to an extension direction of the bent portion of the pin terminal.

12. The connector according to claim 4, wherein, when the second connector housing is inserted into the channel, the straight portion of the pin terminal is connected to an end of the connecting terminal opposite the terminal position assurance device.

13. A connector, comprising:
- a pin terminal including a straight portion and a bent portion;
- a body defining a channel receiving the pin terminal, the channel including:
  - a cavity receiving the straight portion of a pin terminal; and
  - an open groove corresponding to and communicating with the cavity, the groove receiving the bent portion of a pin terminal; and
- a blocking structure formed in the channel and opposing a first side of the bent portion of the pin terminal opposite the straight portion and preventing the bent portion of the pin terminal from rebounding in a first direction away from the straight portion of the pin terminal.

14. The connector of claim 13, wherein the straight portion of the pin terminal extends through the body in a second direction opposite the first direction.

15. The connector of claim 13, wherein the blocking structure further opposes a second side of the bent portion of the pin terminal opposite the first side and prevents the bent portion of the pin terminal from rebounding in a second direction opposite the first direction.

16. The connector according to claim 15, wherein the second side of the bent portion of the pin terminal faces in the second direction, the second direction being a direction of extension of the straight portion of the pin terminal relative to the bent portion of the pin terminal.

17. The connector according to claim 13, wherein the blocking structure includes:
- a first pair of protrusions extending toward each other and opposing the first side of the bent portion of the pin terminal; and
- a second pair of protrusions extending toward each other and arranged on a second side of the bent portion of the pin terminal facing the straight portion and opposite the first side.

18. The connector according to claim 17, wherein the first and second pairs of protrusions define a notch extending parallel to the bent portion of the pin terminal in which the bent portion of the pin terminal is captured.

19. The connector according to claim 13, wherein the pin terminal is insertable into the body in an insertion direction and the blocking structure captures the bent portion of the pin terminal and prevents the bent portion of the pin terminal from rebounding in the insertion direction and a direction opposite the insertion direction.

20. The connector according to claim 13, wherein the blocking portion defines a notch opposing the bent portion of the pin terminal in an insertion direction of the pin terminal and in a direction opposite the insertion direction.

* * * * *